(12) United States Patent
Kondo et al.

(10) Patent No.: US 10,280,949 B2
(45) Date of Patent: May 7, 2019

(54) CONTROL DEVICE FOR HYDRAULIC TRAVELING DEVICE

(71) Applicant: Takeuchi Mfg. Co., Ltd., Nagano (JP)

(72) Inventors: Hiroki Kondo, Ueda (JP); Shumpei Okutani, Ueda (JP); Takeshi Kakuryu, Ueda (JP); Takato Takizawa, Ueda (JP); Tomonori Sato, Ueda (JP)

(73) Assignee: Takeuchi Mfg. Co., Ltd., Nagano (JP)

( * ) Notice: Subject to any disclaimer, the term of this patent is extended or adjusted under 35 U.S.C. 154(b) by 202 days.

(21) Appl. No.: 15/426,574

(22) Filed: Feb. 7, 2017

(65) Prior Publication Data

US 2017/0241448 A1     Aug. 24, 2017

(30) Foreign Application Priority Data

Feb. 18, 2016    (JP) ................................. 2016-028525
Aug. 30, 2016    (JP) ................................. 2016-168514
Dec. 19, 2016    (JP) ................................. 2016-245389

(51) Int. Cl.
     *F15B 11/16*         (2006.01)
     *E02F 9/22*          (2006.01)
     (Continued)

(52) U.S. Cl.
     CPC ............. *F15B 11/16* (2013.01); *B60W 10/06* (2013.01); *B60W 10/103* (2013.01);
     (Continued)

(58) Field of Classification Search
     CPC .... F16H 39/04; F16H 2059/366; F16H 59/46; F16H 61/431; F16H 61/47
     See application file for complete search history.

(56) References Cited

U.S. PATENT DOCUMENTS 3,543,508 A   *   12/1970   Schwab .................. F16H 61/46
                                                         60/445
4,149,380 A       4/1979   Nonnenmacher
(Continued)

FOREIGN PATENT DOCUMENTS

JP         5226569 B2      7/2013

OTHER PUBLICATIONS

The Extended European Search Report issued by the European Patent Office dated Jul. 20, 2017, which corresponds to European Patent Application No. 17154151.9-1762 and is related to U.S. Appl. No. 15/426,574.

*Primary Examiner* — Michael Leslie
*Assistant Examiner* — Matthew Wiblin
(74) *Attorney, Agent, or Firm* — Studebaker & Brackett PC

(57) ABSTRACT

A travel control device is provided with hydraulic pumps of a variable capacity type that are driven by an engine; hydraulic motors that are driven by discharged oil from the hydraulic pumps; traveling devices that are rotation-driven by the hydraulic motors; a travel operation lever that is operated so as to instruct a traveling operation; a first control valve for generating a charged hydraulic pressure by adjusting the discharged oil from a charge pump and a second control valve for generating a capacity control hydraulic pressure in accordance with the operation of the travel operation lever. The first control valve is designed to pressure-adjust and generate a charged hydraulic pressure in accordance with the rotation speed of the engine, and the hydraulic pump is subjected to a variable capacity control process by a capacity control hydraulic pressure that is pressure-adjusted and generated by the second control valve.

5 Claims, 8 Drawing Sheets

(51) Int. Cl.
  *F16H 61/4008* (2010.01)
  *F16H 61/4139* (2010.01)
  *F16H 61/433* (2010.01)
  *F16H 61/465* (2010.01)
  *F16H 61/478* (2010.01)
  *B60W 10/06* (2006.01)
  *B60W 10/103* (2012.01)
  *B60W 30/188* (2012.01)
  *F15B 11/10* (2006.01)
  *F16H 39/04* (2006.01)
  *F16H 59/36* (2006.01)
  *F16H 61/431* (2010.01)

(52) U.S. Cl.
  CPC ......... *B60W 30/188* (2013.01); *E02F 9/225* (2013.01); *E02F 9/2225* (2013.01); *E02F 9/2253* (2013.01); *E02F 9/2267* (2013.01); *E02F 9/2292* (2013.01); *F15B 11/10* (2013.01); *F16H 39/04* (2013.01); *F16H 59/36* (2013.01); *F16H 61/4008* (2013.01); *F16H 61/4139* (2013.01); *F16H 61/431* (2013.01); *F16H 61/433* (2013.01); *F16H 61/465* (2013.01); *F16H 61/478* (2013.01); *B60Y 2200/41* (2013.01); *F15B 2211/20546* (2013.01); *F15B 2211/25* (2013.01); *F15B 2211/275* (2013.01); *F15B 2211/56* (2013.01); *F15B 2211/575* (2013.01); *F15B 2211/633* (2013.01); *F15B 2211/6316* (2013.01); *F15B 2211/6346* (2013.01); *F15B 2211/6355* (2013.01); *F15B 2211/6651* (2013.01); *F15B 2211/6652* (2013.01); *F15B 2211/6653* (2013.01); *F15B 2211/7053* (2013.01); *F15B 2211/7058* (2013.01); *F15B 2211/7135* (2013.01); *F15B 2211/75* (2013.01); *F15B 2211/78* (2013.01); *F15B 2211/8613* (2013.01); *F16H 2059/366* (2013.01)

(56) References Cited

U.S. PATENT DOCUMENTS

| | | | | |
|---|---|---|---|---|
| 4,559,778 | A * | 12/1985 | Krusche | F16H 61/46 417/217 |
| 5,048,294 | A * | 9/1991 | Oshina | F15B 11/0445 60/434 |
| 8,327,638 | B2 * | 12/2012 | Ohtsukasa | E02F 9/2235 60/445 |
| 2006/0288863 | A1 * | 12/2006 | Ueda | F15B 19/005 91/459 |
| 2014/0033691 | A1 * | 2/2014 | Peterson | F16H 61/431 60/327 |

* cited by examiner

CONTROL DEVICE FOR HYDRAULIC TRAVELING DEVICE

RELATED APPLICATIONS

This invention claims the benefit of Japanese Patent Application Nos. 2016-028525, 2016-168514, and 2016-245389 which are hereby incorporated by reference.

TECHNICAL FIELD

The present invention relates to a control device for a hydraulic traveling device of an engine drive type.

TECHNICAL BACKGROUND

As one example of a working vehicle provided with such a hydraulic traveling device, a skid steering loader (for example, see Patent Document 1) in which the traveling devices having tires or crawlers are installed on right and left sides of a vehicle main body has been proposed. In the skid steering loader, making a turn in the proceeding direction is carried out by differentiating the operating speeds of the tires or crawlers by the traveling devices on the right and left sides. In general, the skid steering loader has a structure in which an engine for driving the traveling devices or the like is installed on a rear portion of the vehicle main body and by using the engine driving force, the traveling devices are driven to travel. In this case, as the traveling device, a hydraulic transmission (HST(Hydro-Static Transmission)), which drives a hydraulic pump by an engine and by using a hydraulic motor that is driven by receiving a discharged oil supply from the hydraulic pump, the tires or crawlers are driven to travel, has been used.

In the HST, the hydraulic pump of a variable capacity type is used, and the traveling speed control is carried out by controlling the variable capacity of the hydraulic pump. In this case, the variable capacity control of the hydraulic pump is carried out by using a discharged hydraulic pressure (charged hydraulic pressure) of the charge pump driven by the engine. In the case when, while a working vehicle is allowed to travel by the traveling device using the HST, the engine load is increased by an increase in the traveling load, the engine rotation is lowered, with the result that the discharge amount of the charge pump is also lowered. When the charged hydraulic pressure is lowered, the variable discharge capacity of the hydraulic pump that is controlled by the charged hydraulic pressure is lowered so that the engine load is reduced so as to prevent engine stalling.

RELATED PRIOR ART

Patent Document 1: Japanese Patent No. 5226569

SUMMARY OF THE INVENTION

In this case, however, the control for reducing the variable discharge capacity of the hydraulic pump by reducing the charged hydraulic pressure has a problem in that since the control characteristics thereof differ due to influences of differences in viscosity of oils caused by differences in oil temperature, its engine stall preventing control is not carried out appropriately, in particular at the time of a low temperature. Moreover, another problem is caused in which in the case when the traveling load is abruptly increased, a delay in response in the reduction control of the hydraulic pump capacity is caused by the reduction in the charged hydraulic pressure due to the reduction of the engine rotation, sometimes failing to accurately carry out the engine stall preventing control.

In view of these problems, the present invention has been devised, and its object is to provide a control device for a hydraulic traveling device capable of accurately preventing engine stalling relative to an increase in traveling load.

Means to Solve the Problems

In order to achieve the above-mentioned object, the present invention provides a control device for a hydraulic traveling device having a hydraulic transmission constituted by having a hydraulic pump of a variable capacity type that is driven by an engine and a hydraulic motor that is driven by discharged oil from the hydraulic pump, a traveling device that is driven by the hydraulic motor, a travel operation device that is operated so as to instruct a traveling operation by the traveling device, and a charging pressure control valve for adjusting a hydraulic pressure inside a charging oil passage for supplying oil from the charge pump to the hydraulic transmission into a charging hydraulic pressure. In the hydraulic traveling device constituted in this manner, the control device comprises a first control valve for adjusting the charging hydraulic pressure inside the charging oil passage in accordance with a rotation speed of the engine so as to generate an engine rotation-related control hydraulic pressure and a second control valve for adjusting the engine rotation-related control hydraulic pressure in accordance with the operation of the travel operation device so as to generate a capacity control hydraulic pressure, and a variable capacity controlling of the hydraulic pump is carried by the capacity control hydraulic pressure supplied from the second control valve to the variable capacity control unit.

The control device having the above-mentioned configuration preferably further comprises an accelerator operation device that is operated so as to instruct an engine driving operation, an engine control device for carrying out a driving control operation on the engine in accordance with the operation of the accelerator operation device, a target engine rotation setting device for setting a target engine rotation speed in accordance with the operation of the accelerator operation device and an engine speed detection device for detecting the rotation speed. In this structure, the first control valve adjusts and generates the engine rotation-related control hydraulic pressure so as to make a difference between an actual engine rotation speed detected by the engine speed detection device and the target engine rotation speed set by the target engine rotation setting device smaller.

More preferably, in the control device having the above-mentioned configuration, the first control valve adjusts and generates the engine rotation-related control hydraulic pressure by using PID control so as to make a difference between the actual engine rotation speed and the target engine rotation speed smaller.

More preferably, the control device having the above-mentioned configuration further comprises a hydraulic actuation device that is actuated by a hydraulic actuator, a main pump for supplying a working oil to be supplied to the hydraulic actuator, an actuation control valve of a hydraulic pilot type for performing control for supplying the discharge oil of the main pump to the hydraulic actuator, an actuation operation device that is operated so as to instruct the actuation of the hydraulic actuation device, and a third control valve for performing control so as to supply a pilot pressure for controlling the actuation of the actuation control valve to the actuation control valve in accordance with the operation of the actuation operation device. In the control device, the third control valve is designed to generate the pilot pressure by using the engine rotation-related control hydraulic pressure, a pilot detection device for detecting whether the pilot pressure has been supplied from the third control valve to the actuation control valve is provided, and when the supply of the pilot pressure to the actuation control valve has been detected by the pilot detection device, the target engine rotation speed is lowered.

Furthermore, the above-mentioned control device of the present invention may further comprises a hydraulic actuation device that is actuated by a hydraulic actuator, a main pump for supplying a working oil to be supplied to the hydraulic actuator, an actuation control valve of a hydraulic pilot type for performing control for supplying the discharge oil of the main pump to the hydraulic actuator, an actuation operation device that is operated so as to instruct the actuation of the hydraulic actuation device, and a third control valve for performing control so as to supply a pilot pressure for controlling the actuation of the actuation control valve to the actuation control valve in accordance with the operation of the actuation operation device. In the control device, the third control valve may perform control for supplying oil that has been set to a charging hydraulic pressure inside the charging oil passage to the pilot actuation unit of the actuation control valve in accordance with the operation of the actuation operation device In the control device of the present invention having the above-mentioned configuration, the charged pressure control valve is preferably designed to adjust pressure by suppressing fluctuations in the charging hydraulic pressure relative to a change in the charge oil amount to be supplied to the hydraulic transmission from the charge pump through the charging oil passage.

Advantageous Effects of the Invention

In accordance with the control device for the hydraulic traveling device related to the present invention configured as described above, the engine rotation-related control hydraulic pressure is generated by the first control valve by using the charged hydraulic pressure that is pressure-adjusted by the charged pressure control valve, and the capacity control hydraulic pressure is generated in accordance with the operation of the travel operation device from the engine rotation-related control hydraulic pressure by the second control valve, and by supplying this pressure to the variable capacity control unit of the hydraulic pump of the hydraulic transmission, the variable capacity control operation is carried out. For this reason, even at the time of lowering of the engine rotation due to an increase of a traveling load or the like, by reducing the engine rotation-related control hydraulic pressure quickly as well as accurately, the capacity control hydraulic pressure can be reduced. Thus, it is possible to accurately prevent engine stalling by reducing the capacity of the hydraulic pump quickly as well as accurately even at the time of an increase in a traveling load or a low oil temperature.

In the control device having the above-mentioned configuration, the first control valve is preferably designed so as to pressure-adjust and generate the engine rotation-related control hydraulic pressure so as to reduce a difference between the actual engine rotation speed and the target engine rotation speed, and with this configuration, it is possible to accurately prevent engine stalling at the time of an increase in a traveling load or the like by using only a simple control based upon the engine rotation speed.

Moreover, in this case, the first control valve is preferably designed to pressure-adjust and generate an engine rotation-related control hydraulic pressure by using PID control so as to reduce a difference between the actual engine rotation speed and the target engine rotation speed. With this arrangement, it is possible to carry out more accurate travel control operation and engine stalling preventive control operation.

Moreover, the control device relating to the above-mentioned present invention is preferably provided with a hydraulic actuation device that is actuated by a hydraulic actuator, a main pump for supplying working oil to the hydraulic actuator, an actuation control valve of a hydraulic pilot type for carrying out a control operation so as to supply the discharged oil of the main pump to the hydraulic actuator, an actuation operation device that is operated so as to instruct the actuation of the hydraulic actuation device and a third control valve for carrying out a control operation so as to supply a pilot pressure for use in controlling the actuation of the actuation control valve in accordance with the operation of the actuation operation device. In this configuration, the third control valve is further designed to generate the above-mentioned pilot pressure by adjusting the charged hydraulic pressure that is pressure-adjusted and generated by the first control valve, and a pilot detection device for detecting the supply of the pilot pressure from the third control valve to the actuation control valve is further installed so that when the supply of the pilot pressure to the actuation control valve is detected by the pilot detection device, the target engine rotation speed is preferably lowered. With this configuration, in the case when the actuation operation device is operated upon lowering the charged hydraulic pressure so as to prevent stalling at the time of an increase of traveling load or the like, since the target engine rotation speed is lowered, the charged hydraulic pressure is increased in response to the lowering thereof so that it is possible to also prevent the engine stalling while ensuring the actuation of the actuation control valve by raising the lowered pilot pressure.

In the control device in accordance with the present invention, a configuration may be further provided in which the third control valve supplies the charged pressure to the pilot actuation unit of the actuation control valve so that the actuation oil supplying control to the hydraulic oil actuator may be carried out by the actuation control valve. In other words, the configuration may be provided in which the controlling process is carried out by using the charged pressure which, even when the engine rotation is lowered, is hardly affected by the influences thereof. With this arrangement, even at the time of lowering of the engine rotation, it becomes possible to ensure the actuation of the hydraulic actuator in response to the operation of the actuation operation device.

As known from the above description, the charged pressure control valve is preferably designed so that the pressure adjustment is carried out by suppressing fluctuations in the charged hydraulic pressure relative to a change in the amount of charged oil supplied to the hydraulic transmission from the charge pump through the charged oil passage. This configuration means that the charged pressure control valve is made to be less susceptible to degradation in override characteristics, that is, to have small lowering (changing) characteristics in the charged hydraulic pressure relative to the lowering of the charged discharge amount, and by this configuration, by reducing the charged pressure fluctuations relative to the engine rotation fluctuations, the actuation of the hydraulic actuator in response to the operation of the actuation operation device is positively ensured.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTIONS OF THE DRAWINGS

The present invention will become more fully understood from the detailed description given herein below and the accompanying drawings which are given by way of illustration only and thus are not limitative of the present invention.

FIG. 2A is a plan view, and FIG. 2B is a front view.

DESCRIPTION OF THE EMBODIMENTS

Referring to drawings, explanation will be given on first to third embodiments in accordance with the present invention. In these first to third embodiments, the explanation will be given by exemplifying a case in which the present invention is applied to a crawler type skid steering loader (hereinafter, referred to as "crawler loader") in which a bucket is attached to the tip of an arm. First, referring to FIG. 1 to FIG. 3, the entire configuration of a crawler loader 1 commonly used in the first to third embodiments will be explained.

Figure 1:
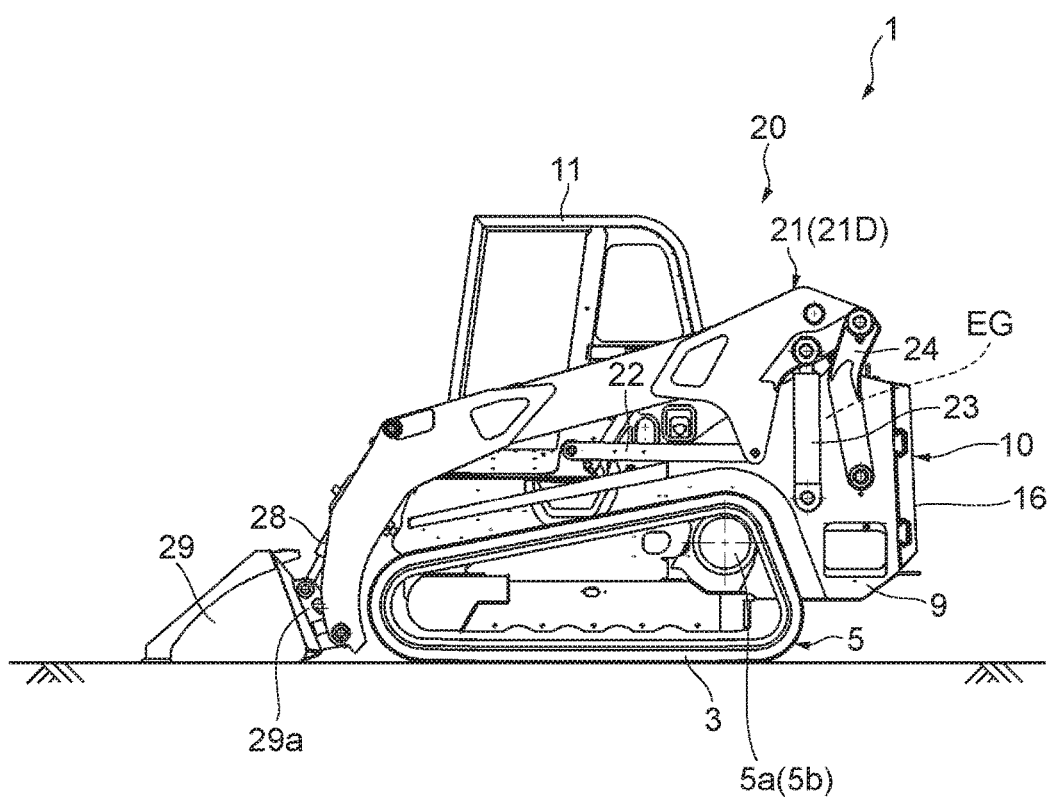
FIG. 1 is a left side view showing a crawler type skid steering loader provided with a control device in accordance with the present invention in a state in which its arm is rocked to a lowermost action position.
Figure 2A:
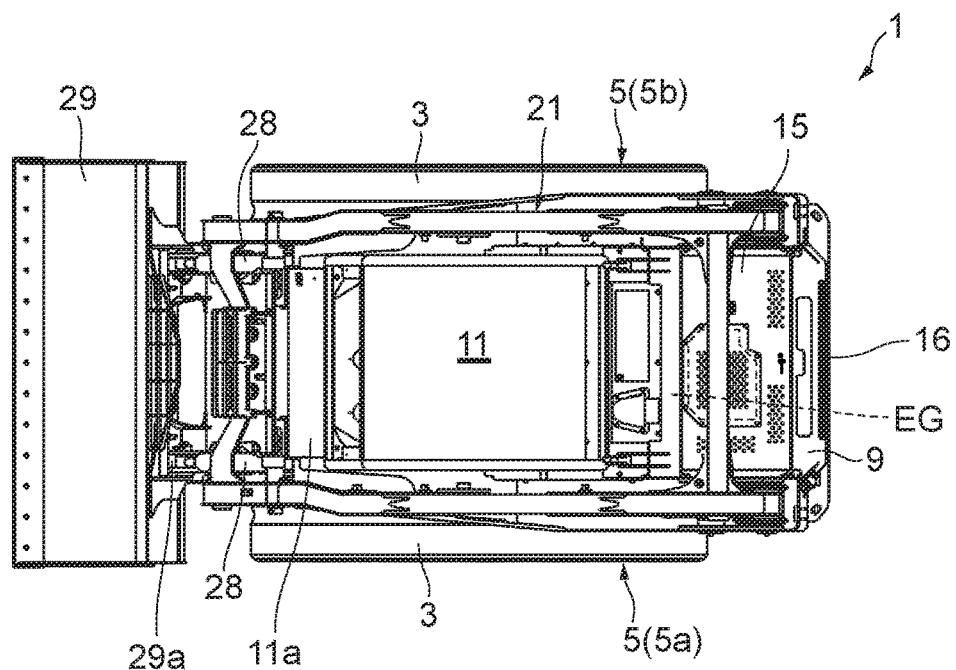
FIG. 2A and FIG. 2B are views showing the skid steering loader.
Figure 2B:
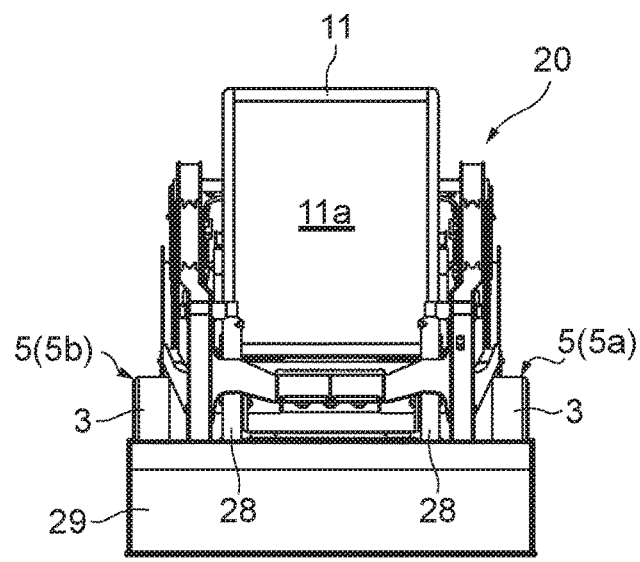
Figure 3:
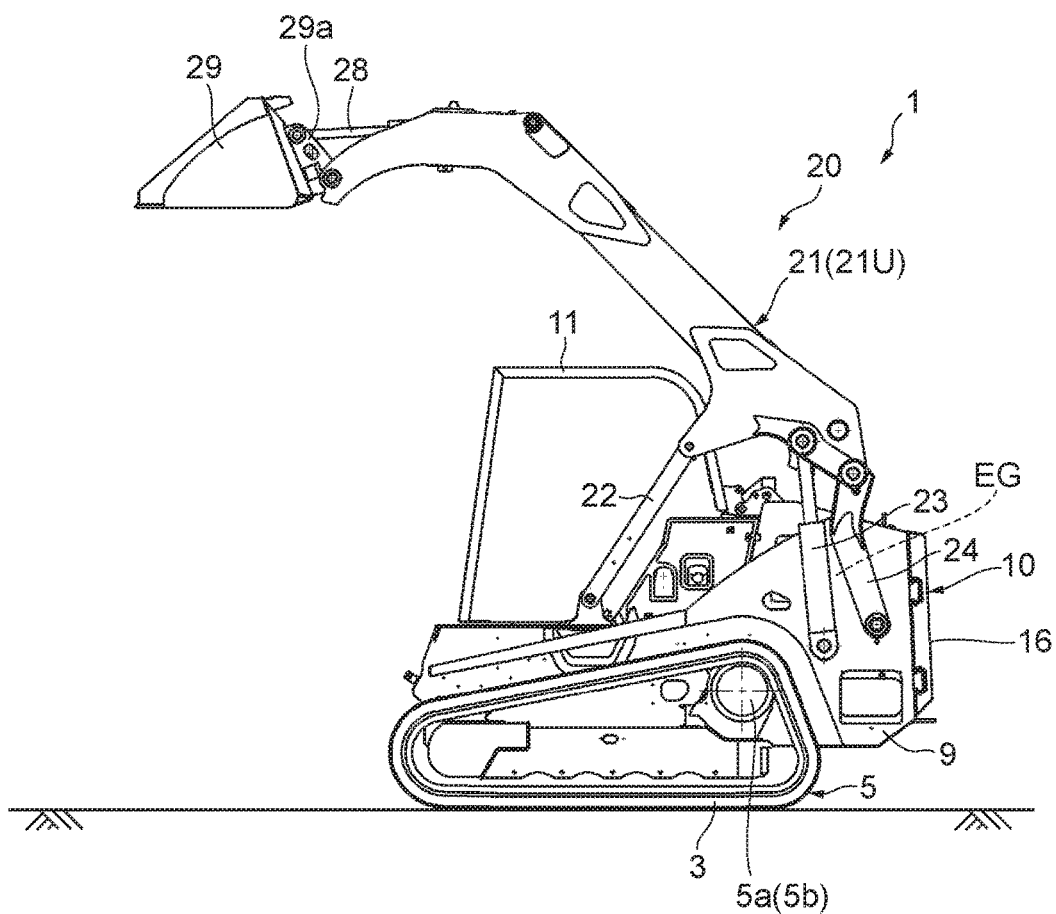
FIG. 3 is a right side view showing the skid steering loader in a state in which its arm is rocked to an uppermost action position.

As shown in FIG. 1 to FIG. 3, the crawler loader 1 is provided with right and left paired traveling devices 5 constituted by using endless crawler belts 3, a main body frame 9 to which the traveling devices 5 are attached on the right and left sides, a loader device 20 (hydraulic actuation device) attached to the main body frame 9 and an operator cabin 11 installed on the upper center of the main body frame 9. The traveling devices 5 together with the main body frame 9 are hereinafter referred to as "vehicle 10".

The operator cabin 11 is formed into a box shape, with an opening located on the vehicle front side, and a front door 11a that is freely openable and closable is attached to the opening. Inside the operator cabin 11, an operator seat (not shown) on which the operator sits facing the vehicle front side is installed inside the operator cabin 11, and on the right and left sides of the operator seat, a travel operation lever 52 (forming a travel operation device, see FIG. 4) for operating the driving process of the traveling devices 5 and a loader operation lever (forming an actuation operation device, for example, an arm operation lever 78 shown in FIG. 4) for operating the driving process of the loader device 20 are installed.

As described above, the loader device 20 is attached to the main body frame 9, and a plurality of pivotally joining points for use in attaching the loader device 20 thereto are formed on the main body frame 9. The loader device 20 is constituted by an arm 21 installed in a manner so as to surround the front and rear sides as well as the right and left sides of the operator cabin 11, right and left paired control links 22 attached so as to bridge over the main body frame 9 and the arm 21, right and left paired arm cylinders 23 attached so as to bridge over the main body frame 9 and the arm 21 on the rear side of the control links 22, right and left paired lift links 24 attached so as to bridge over the main body frame 9 and the arm 21 on the rear side of the arm cylinders 23, and a bucket 29 attached to the front end of the arm 21 through a bracket 29a. The right and left paired control links 22, the arm cylinders 23 and the lift links 24 are laterally installed symmetrically, and the arm 21 is attached to the main body frame 9 through the control links 22, the arm cylinders 23 and the lift links 24.

The bracket 29a is pivotally connected to the tip of the arm 21 so as to freely rock longitudinally thereon, and to the bracket 29a, the bucket 29 is freely detachably attached. By actuating the bucket cylinders 28 installed on the tip of the arm 21 so as to contract and extend thereon, the bucket 29 (bracket 29a) is allowed to rock longitudinally relative to the arm 21.

When the operator sits on the operator seat and operates the travel operation lever and the loader operation lever, the crawler loader 1 drives the traveling devices 5 in response to the operation of each operation lever to allow the vehicle 10 to travel and move, or actuates an arm cylinder 23 to contact or extend so that the arm 21 is rocked longitudinally, or actuates the bucket cylinder 28 to contract or extend so that the bucket 29 is rocked longitudinally. In this case, by actuating the arm cylinder 23 to contract or extend, the arm 21 is allowed to rock longitudinally between the lowermost action position 21D and the uppermost action position 21U. In this manner, the arm cylinder 23 and the bucket cylinder 28 actuate the loader device 20 in accordance with the operation of the loader operation lever; thus, hereinafter, the arm cylinder 23 and the bucket cylinder 28 are generally referred to as "loader actuator" (hydraulic actuator).

The crawler loader 1 is provided with a diesel engine EG (hereinafter, referred to as "engine EG") installed on the rear side position of the operator cabin 11 of the upper portion on the rear side of the main body frame 9. The traveling devices 5, the arm cylinder 23 and the bucket cylinder 28 are configured so as to be driven by receiving working oil from a hydraulic pump (main pump) driven by the engine EG. The engine EG is covered with side frames of the main body frame 9 on its right and left sides, and also covered with an engine cover 15 and a rear door 16 on the upper side and the rear side thereof. The engine cover 15 is installed on the main frame 9 so as to be openable and closable longitudinally by using right and left paired hinge mechanisms (not shown) formed on the front end.

The driving force of the engine EG is used for actuating the arm cylinder 23 and the bucket cylinder 28, and is also transmitted to the right and left traveling devices 5 so as to make the vehicle 10 travel. Referring to a hydraulic circuit diagram of FIG. 4 explanation will be given on the configuration for use in making the vehicle 10 travel. As shown in FIG. 1 and FIG. 3, the right and left traveling devices 5 are respectively provided with driving sprockets 5a and 5b, and by rotation-driving the driving sprockets 5a and 5b, the crawler belts 3 are driven so that the vehicle 10 is allowed to travel. The right and left driving sprockets 5a and 5b are rotation-driven by hydraulic motors 32 and 42 respectively installed on the right and left sides. That is, the traveling devices 5 are driven by the hydraulic motors 32 and 42.

Figure 4:
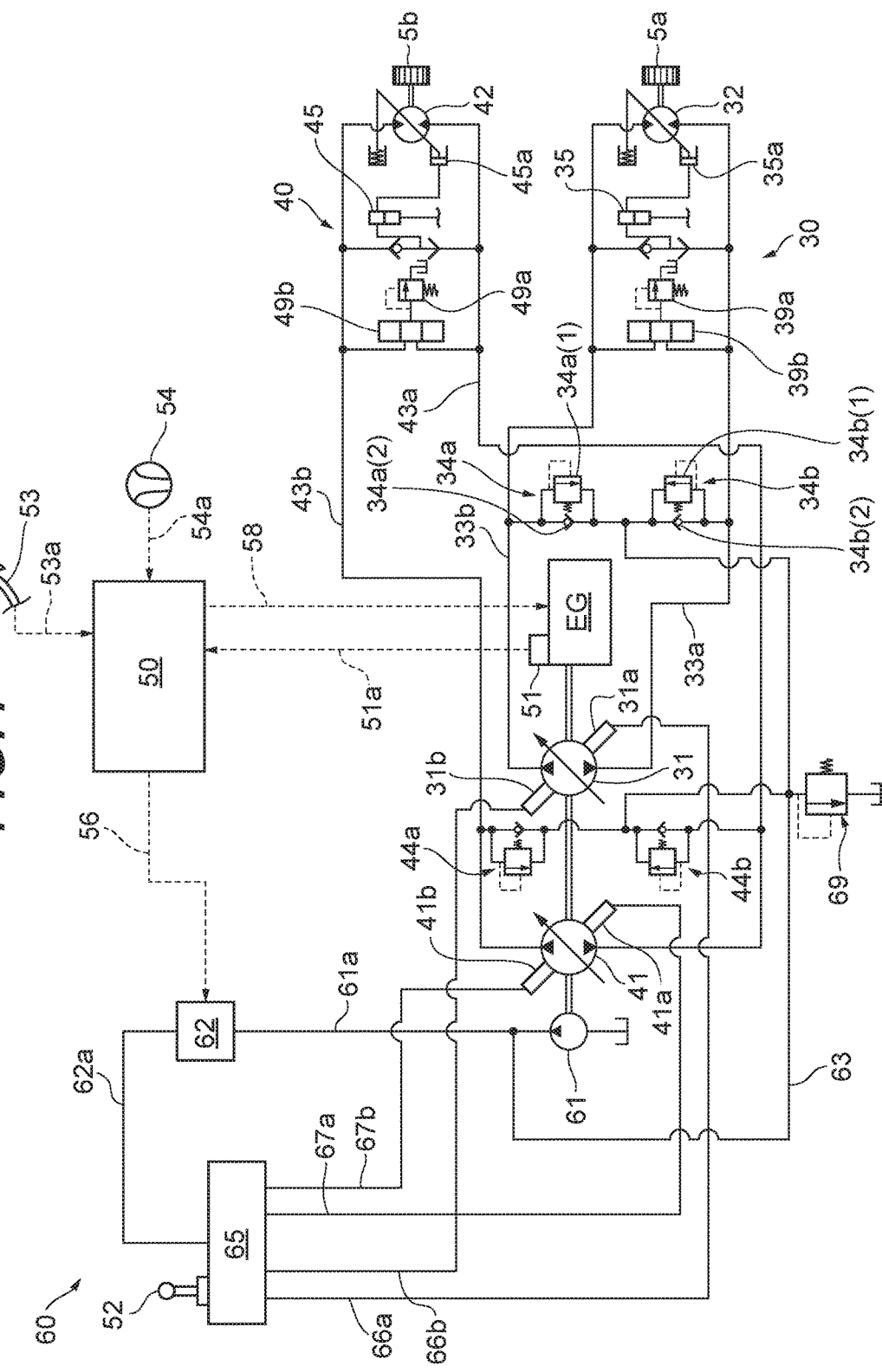
FIG. 4 is a view showing a hydraulic circuit diagram showing a configuration of a control device in accordance with a first embodiment.

As shown in FIG. 4, each of the hydraulic motors 32 and 42 constitutes one portion of each of the right and left HSTs (hydraulic transmissions) 30 and 40. The HSTs 30 and 40 have the same configurations laterally, and by exemplifying the left HST 30, explanation is given on the configuration thereof. In the left HST 30, the left hydraulic motor 32 is coupled to a left hydraulic pump 31 that is rotation-driven by the engine EG, through oil passages 33a and 33b so as to form a hydraulic closed circuit. When the left hydraulic pump 31 is rotation-driven by the engine EG, the discharged oil is supplied to the left hydraulic motor 32 through, for example, the oil passage 33a so that this motor is rotation-driven. As a result, the left driving sprocket 5a is rotation-driven by the left hydraulic motor 32 so that the left crawler belt 3 is driven, and the travel-driving operation of the vehicle 10 is carried out by the left traveling device 5. The oil that has been used for driving the left hydraulic motor 32 is returned to the left hydraulic pump 31 through the oil passage 33b.

In the left HST 30, the left hydraulic pump 31 is a pump of a variable capacity type, and its discharge capacity is variably controlled by variable capacity control actuators 31a and 31b. This variable capacity control will be described later. The left hydraulic motor 32 can be capacity-switched to high and low two stages, and by carrying out a hydraulic pressure supply control to a capacity switching cylinder 35a by the speed switching valve 35, the capacity switching operation of two stages can be carried out. Moreover, high-pressure relief valve sets 34a and 34b for preventing the hydraulic pressure inside the closed circuit of the left HST 30 from becoming high exceeding a predetermined pressure and a flushing relief valve 39a for supplying and cooling the circulation oil into the HST 30 are also installed. Before the flushing relief valve 39a, a shuttle valve 39b is installed, and of the oil passages 33a and 33b forming the hydraulic closed circuits, the oil passage on the low pressure side is connected to the flushing relief valve 39a.

The high-pressure relief valve sets 34a and 34b are designed to receive the pressure of charged oil inside the charged oil passages 61b and 63, which is discharged from the charge pump 61 driven by the engine EG and pressure-adjusted by the charged pressure control valve 69, from a branched charging oil passage 63a. The high-pressure relief valve sets 34a and 34b are respectively provided with high-pressure relief valves 34a(1) and 34b(1) and check valves 34a(2) and 34b(2). By the functions of these check valves 34a(2) and 34b(2), of the oil passages 33a and 33b forming hydraulic closed circuits, charged oil is supplied to the oil passage on the low-pressure side through the check valve so that the hydraulic pressure of the oil passage on the high-pressure side is prevented from becoming too high exceeding a predetermined pressure by the high-pressure relief valves 34a(1) and 34b(1).

Since the right HST 40 has the same configuration as the left HST 30, explanation will be briefly given, while avoiding overlapped explanations. In the right HST 40, a right hydraulic pump 41 of the variable capacity type that is rotation-driven by the engine EG is connected to the right hydraulic motor 42 through the oil passages 43a and 43b. When the right hydraulic pump 41 is rotation-driven by the engine EG, the right hydraulic motor 42 is rotation-driven by receiving the discharged oil supply, and the right driving sprocket 5b is rotation-driven so as to drive the right crawler belt 3 so that the vehicle 10 is driven to travel by the right traveling device 5. The right hydraulic motor 42 can also be capacity-switched to high and low two stages. In the right HST 40 also, high-pressure relief valve sets 44a and 44b, a flushing relief valve 49a and a shuttle valve 49b are installed. The high-pressure relief valve sets 44a and 44b receive charged oil from a branched charged oil passage 63b.

As can be understood by the above-mentioned explanation of the configuration, the left and right hydraulic pumps 31 and 41 are rotation-driven by the engine EG, and the discharged oil is sent to the left and right hydraulic motors 32 and 42 through the respective oil passages 33a, 33b, 43a and 43b so that these motors are rotation-driven. As a result, the left and right driving sprockets 5a and 5b are driven by the left and right hydraulic motors 32 and 42 so that travel driving operations are carried out by the right and left traveling devices 5. The high-low two-stage switching operations of the left and right hydraulic motors 32 and 42 are simultaneously carried out so as to set either the high-speed stage or low-speed stage. In contrast, the variable capacity control of the left and right hydraulic pumps 31 and 41 is carried out independently so that the driving speeds of the right and left traveling devices 5 are independently controlled. When the right and left traveling devices 5 are driven at the same speed in the same direction, a straight traveling operation can be carried out, and a steering operation for changing the traveling direction can be carried out by making the right and left traveling speeds different from each other.

First Embodiment

By carrying out the variable capacity control of the left and right hydraulic pumps 31 and 41 in this manner, a travel control operation can be carried out, and the following description will discuss a travel control device 60 for carrying out this travel control operation. Since the travel control device 60 is different in its structure depending on embodiments, and first, the following description will discuss a first embodiment.

In the left and right hydraulic pumps 31 and 41, variable capacity control actuators 31a, 31b, 41a and 41b are respectively installed, and by controlling a capacity control hydraulic pressure Pc to be applied to these variable capacity control actuators 31a, 31b, 41a and 41b, variable capacity control of the left and right hydraulic pumps 31 and 41 can be performed. More specifically, when the capacity control hydraulic pressure Pc is low, the capacities of the hydraulic pumps 31 and 41 are made smaller, and as the capacity control hydraulic pressure Pc becomes higher, the capacities of the hydraulic pumps 31 and 41 are made greater.

The capacity control hydraulic pressure Pc is obtained from a charge pump 61 that is rotation-driven by the aforementioned engine, in the following manner. The discharged oil from the charge pump 61 is sent to a first control valve 62 through an oil passage 61a, where an engine rotation-related control hydraulic pressure Pe is adjusted and generated. Additionally, the oil passage 61a has a charging hydraulic pressure Pch that is pressure-adjusted by a charge pressure control valve 69 through an oil passage 63. The oil having the engine rotation-related control hydraulic pressure Pe is sent to a second control valve 65 through an oil passage 62a. The second control valve 65 adjusts the engine rotation-related control hydraulic pressure Pe in response to an operation of the travel operation lever 52 mechanically coupled to the second control valve 65, and generates a left capacity control hydraulic pressure PcL to be supplied to the variable capacity control actuators 31a and 31b of the left hydraulic pump 31 and a right capacity control hydraulic pressure PcR to be supplied to the variable capacity control actuators 41a and 41b of the right hydraulic pump 41. These capacity control hydraulic pressures PcL and PcR are supplied to the variable capacity control actuators 31a, 31b, 41a and 41b through the respective oil passages 66a, 66b, 67a and 67b so that the variable capacity control of the left and right hydraulic pumps 31 and 41 can be carried out.

The travel control device 60 constituted in this manner is provided with a controller 50 for controlling the actuation of the first control valve 62. To the controller 50, actual rotation speed (Nea) information of the engine EG, which has been detected by an engine rotation sensor 51, is inputted through a signal line 51a, operation information (stepping-in amount information) of an accelerator pedal 53 is inputted through a signal line 53a, and operation information of an accelerator operation dial 54 is also inputted through a signal line 54a. Based upon these pieces of input information, the controller 50 performs actuation control of the first control valve 62 through a signal line 56, and allows an engine control device (not shown) to perform engine driving control through a signal line 58. The accelerator pedal 53 and accelerator operation dial 54 are collectively referred to as "accelerator operation device".

The control by this controller 50 will be explained. When the operation information (stepping-in amount information) of the accelerator pedal 53 or the operation information of the accelerator operation dial 54 is inputted, an instruction signal is sent to the engine rotation control device so as to have the engine rotation in accordance with the accelerator operation amount so that the engine driving control (acceleration control or throttle control) is carried out. Therefore, a target engine rotation speed (NeO) in accordance with the operation amount of the accelerator pedal or the operation position of the accelerator operation dial 54 is determined. This target engine rotation speed (NeO) is a target value of the engine rotation when a predetermined engine load is exerted, and in the case when at the time of the above-mentioned engine driving control, the travel operation lever 52 is not operated, with no load being applied to the engine EG, an idling rotation state having a rotation speed higher than the target engine rotation speed (Neo) is exerted. As is clear from the above, the controller 50 is provided with the engine control device for carrying out a driving control on the engine EG in accordance with the operation of the accelerator operation device and a target engine rotation speed setting device for setting the target engine rotation speed (Neo) in accordance with the operation of the accelerator operation device.

When the travel operation lever 52 is operated, the second control valve 65 adjusts and generates capacity control hydraulic pressures PcL and PcR to be supplied to the variable capacity control actuators 31a, 31b, 41a and 41b in accordance with the operation of the travel operation lever 52 so that variable capacity control of the left and right hydraulic pumps 31 and 41 is carried out. As a result, hydraulic pressures are supplied to the left and right hydraulic motors 32 and 42 from the left and right hydraulic pumps 31 and 41 in accordance with the variable capacity control so as to rotation-drive the hydraulic motors 32 and 42 so that the right and left traveling devices 5 are driven to allow the vehicle 10 to travel in accordance with the operation of the travel operation lever 52.

In the case of actuating the left and right hydraulic pumps 31 and 41 in this manner, since the resulting driving load is exerted on the engine EG, the engine rotation is lowered in accordance with the load. This change in the engine rotation is transmitted to the controller 50, and the controller 50 controls the actuation of the first control valve 62 so as to generate an engine rotation-related control hydraulic pressure Pe corresponding to the actual engine rotation speed (Nea). At this time, in the case when the actual engine rotation speed (Nea) is coincident with the target engine rotation speed (Neo), for example, in a predetermined throttle state of the engine, the controller 50 is allowed to generate the engine rotation-related control hydraulic pressure Pe by the first control valve 62 so as to set the capacities of the hydraulic pumps 31 and 41 to such capacities as to correspond to the operation of the travel operation lever 52. More specifically, it is allowed to generate the engine rotation-related control hydraulic pressure Pe in a manner so as to generate capacity control hydraulic pressures PcL and PcR in accordance with the operation of the travel operation lever 52.

On the other hand, in the case when the actual engine rotation speed (Nea) is lower than the target engine rotation speed (Neo), the controller 50 reduces the engine rotation-related control hydraulic pressure Pe generated by the first control valve 62. Thus, the capacity control hydraulic pressures PcL and PcR to be generated by the second control valve 65 in accordance with the operation of the travel operation lever 52 are reduced in a manner so as to correspond to the reduced engine rotation-related control hydraulic pressure Pe so that the capacities of the hydraulic pumps 31 and 41 are lowered. As a result, the driving load of the hydraulic pumps 31 and 41 caused by the engine is lowered so that the engine rotation is raised. With this arrangement, in spite of the engine load, that is, a change in the traveling load, it is possible to carry out such a control operation as to maintain the actual engine rotation speed (Nea) in the same level as the target engine rotation speed (Neo) or as to make it closer thereto, thereby making it possible to positively prevent engine stalling.

Figure 5:
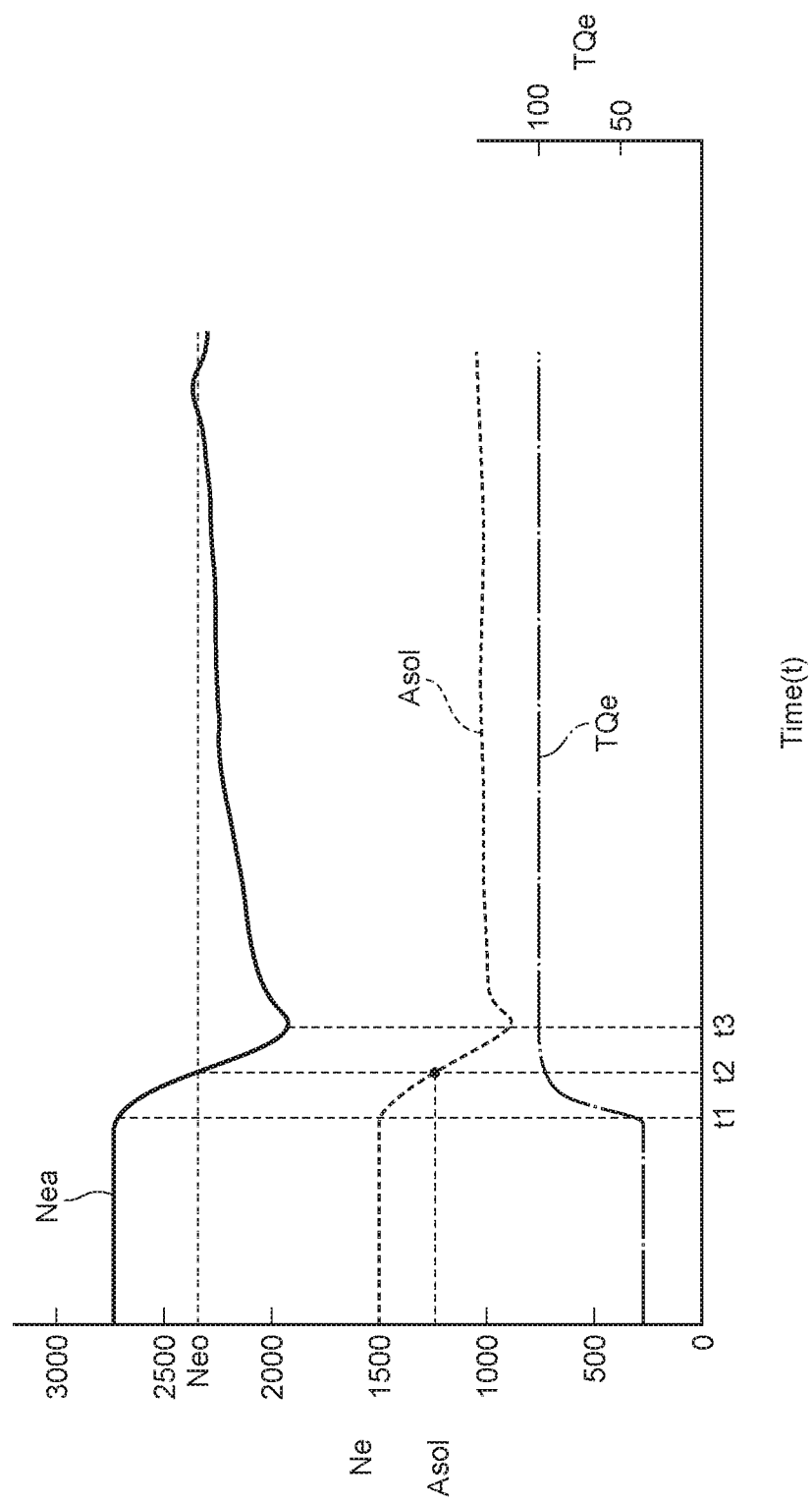
FIG. 5 is a time chart showing control contents by the control device in accordance with the first embodiment.

Referring to FIG. 5, explanation will be given on a specific example of the above-mentioned control by the controller 50. FIG. 5 shows a graph indicating the actual engine rotation speed Nea (rpm), the driving torque TQe (%) of the engine and a change with the elapse of time of a supply current Asol (mA) of a solenoid for use in controlling the engine rotation-related control hydraulic pressure Pe that is pressure-adjusted by the first control valve 62. The supply current Asol (mA) shows the engine rotation-related control hydraulic pressure Pe.

This drawing shows a state in which the target engine rotation speed (Neo) is set to 2400 rpm by the accelerator operation dial 54, the travel operation lever 52 is not operated until time t1 and kept at a neutral position, and from time t1, the travel operation lever 52 is operated so that the vehicle 10 is allowed to travel. Since the travel operation lever 52 is kept at the neutral position up to time t1, the second control valve 65 is actuated so as to set the capacities of the left and right hydraulic pumps 31 and 41 to zero. As a result, the engine EG is brought into a no-load state, and the actual engine rotation speed Nea is set to a value higher than the target engine rotation speed Neo, for example, about 2750 rpm as shown in the drawing. At this time, the solenoid supply current Asol for use in controlling the engine rotation-related control hydraulic pressure Pe by the first control valve 62 has a high value of 1500 mA corresponding to the high engine rotation speed, and although the engine rotation-related control hydraulic pressure Pe has a high pressure, the capacity control hydraulic pressures PcL and PcR to be pressure-adjusted and generated by the second valve 65 have pressures that set the capacities of the right and left hydraulic pumps 31 and 34 to zero.

When the travel operation lever 52 is operated from time t1, the second control valve 65 adjusts and generates the capacity control hydraulic pressures PcL and PcR in accordance with the operation of the operation lever 52. As a result, the capacities of the left and right hydraulic pumps 31 and 41 are set to capacities in accordance with the operation of the operation lever 52 so that the discharged oil is sent to the left and right hydraulic motors 32 and 42 so as to be rotated, and the left and right sprockets 5a and 5b are rotation-driven so that the vehicle 10 is started to travel. At this time, loads for rotation-driving the left and right hydraulic pumps 31 and 41 are exerted on the engine EG and in response to the increase of the loads, the actual engine rotation speed Nea is lowered as shown in the Figure. At the same time, the driving torque TQe of the engine forms an output in accordance with the pump driving load from the no-load state, and the solenoid supply current Asol for use in controlling the engine rotation-related control hydraulic pressure Pe by the first control valve 62 is lowered from 1500 mA in response to the lowering of the actual engine rotation speed Nea.

At time t2, the actual engine rotation speed Nea is coincident with the target engine rotation speed Neo, and the supply current Asol of the solenoid at this time is 1250 mA. This supply current value is designed so as to set the engine rotation-related control hydraulic pressure Pe that is pressure-adjusted and set by the first control valve 62 to a target engine rotation-related control hydraulic pressure Peo that allows the capacity control hydraulic pressures PcL and PcR pressure-adjusted and set by the second control valve 65 in accordance with the operation of the operation lever 52, as they are, to be obtained. Since the inequality of the actual engine rotation speed Nea>the target engine rotation speed Neo is held from time t1 to time t2, the engine rotation-related control hydraulic pressure Pe is higher than the target engine rotation-related control hydraulic pressure PeO.

Even after passing through time t2, the actual engine rotation speed Nea is continuously lowered by the engine driving load, and in response to this, the solenoid supply current Asol is also lowered. Thus, the engine rotation-related control hydraulic pressure Pe that is pressure-adjusted and set by the first control valve 62 is lowered from the above-mentioned target engine rotation-related control hydraulic pressure Peo, with the result that the capacity control hydraulic pressures PcL and PcR to be pressure-adjusted and set by the second control valve 65 in accordance with the operation of the operation lever 52 are lowered. As a result, the capacities of the hydraulic pumps 31 and 41 are lowered and the engine driving load is reduced. In this graph, although the actual engine rotation speed Nea becomes lowest at time t3, it is moderately raised thereafter in response to the reduction of the engine driving load, and gradually approaches the target engine rotation speed Neo. When the engine rotation speed has reached the target engine rotation speed NeO, a hydraulic pump driving operation in well-balanced with the engine driving force can be obtained. At this time, the pressure adjustment of the engine rotation-related control hydraulic pressure Pe by the first control valve 62 is carried out by PID control based upon the difference between the actual engine rotation speed Nea and the target engine rotation speed Neo. Thus, a smooth pressure adjustment in accordance with the rotation difference can be carried out.

By controlling the engine rotation-related control hydraulic pressure Pe by the first control valve 62 in relation to the actual engine rotation speed Nea as described above, the variable capacity control of the hydraulic pumps 31 and 41 is carried out so as to set the actual engine rotation speed Nea to the target engine rotation speed Neo so that traveling control relative to fluctuations of the engine load can be quickly carried out appropriately. As a result, even in the case when the oil temperature is low or when the traveling load abruptly increases, the traveling control can be carried out precisely so that it becomes possible to positively prevent engine stalling.

In the above description, explanation has been given on a case in which the travel driving hydraulic pumps 31 and 41 are driven by the engine EG. However, the engine EG is also used for driving a loader-use hydraulic pump (not shown) for use in supplying working oil to an arm cylinder 23 and a bucket cylinder 28 for driving the loader device 20. Upon actuating these arm cylinder 23 and bucket cylinder 28 as well, the resulting engine load corresponds to a summed load of the driving load of the loader-use hydraulic pump in addition to the travel driving load in the above-mentioned control, and relative to the summed load, the actual engine rotation speed Nea is controlled to be set to the target engine rotation speed Neo.

Second Embodiment

Figure 6:
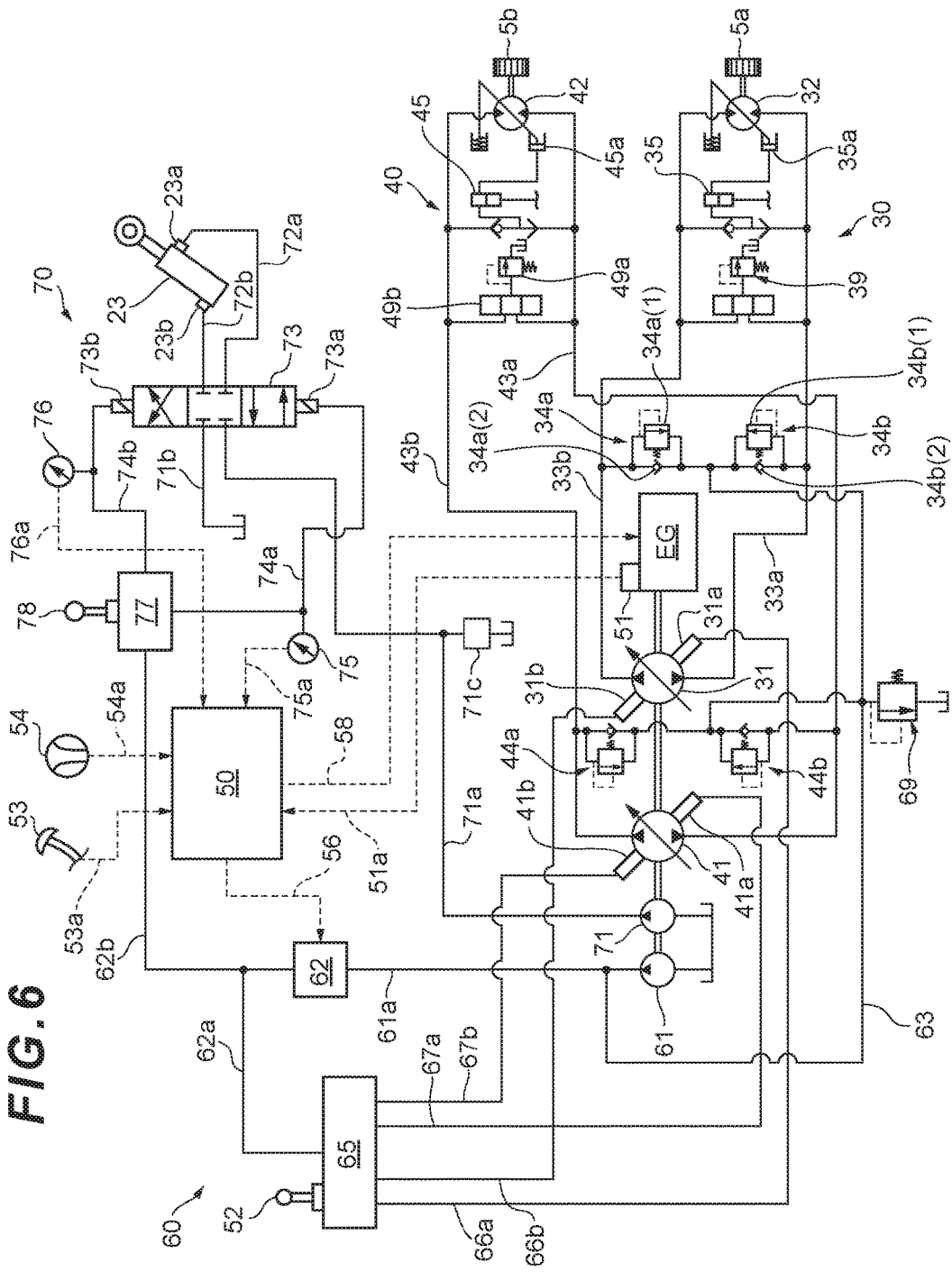
FIG. 6 is a hydraulic circuit diagram showing a configuration of a control device in accordance with a second embodiment.

Next the following description will discuss a second embodiment. In the second embodiment, the explanation relating to travel control based upon the operation of the above-mentioned travel operation lever 52 is the same as that of the first embodiment. In a crawler loader 1 controlled to travel as described above, actuation control for a loader device 20 in accordance with the operation of a loader operation lever is also required. This loader control may be prepared as an independent control operation from the above-mentioned traveling control; however, in the second embodiment, in order to make the device configuration as simple as possible so as to reduce costs, the travel control device and the loader control device are formed as mutually related configurations. Referring to FIG. 6, explanation will be given by exemplifying a control device configuration in which the travel control device and the loader control device are related to each other as the second embodiment.

The control device shown in FIG. 6 has a configuration in which to the travel control device 60 having substantially the same configuration as that shown in FIG. 4, a loader control device 70 is added. Therefore, overlapped portions in the configuration of the travel control device 60 are indicated by the same reference numerals and symbols. Hereinbelow, explanation will be given on the configuration of the control device of FIG. 6 mainly concerning portions different from those of the configuration shown in FIG. 4. Since the configurations of the left and right HST 30 and 40 for rotation-driving the driving sprockets 5a and 5b of the left and right traveling devices 5 are the same as those shown in FIG. 4, the explanation thereof will be omitted.

A control device shown in FIG. 6 is provided with the same travel control device 60 as that shown in FIG. 4, and this travel control device uses a hydraulic pressure supplied from the charge pump 61 driven by the engine EG. The control device is further provided with a main pump 71 for supplying a hydraulic pressure for carrying out the actuation control of the loader control device 70, and this main pump 71 is also rotation-driven by the engine EG so as to supply its discharged oil to an oil passage 71*a*. The control of supplying the hydraulic pressure to be supplied to the oil passage 71*a* to the loader actuator (in FIG. 6, arm cylinder 23 is exemplified) is carried out by the loader control device 70; however, the description thereof will be given later, and first, explanation is briefly given on the travel control device 60.

As described above, the discharged oil (having a charging pressure adjusted by the charge pressure control valve 69) from the charge pump 61 that is rotation-driven by the engine EG as described above is sent to the first control valve 62 through the oil passage 61*a* where an engine rotation-related control hydraulic pressure Pe is adjusted and generated. The oil having this engine rotation-related control hydraulic pressure Pe is pressure-adjusted by the second control valve 65 in accordance with the operation of the travel operation lever 52 so that a left capacity control hydraulic pressure PcL to be supplied to the variable capacity control actuators 31*a* and 31*b* of the left hydraulic pump 31 and a right capacity control hydraulic pressure PcR to be supplied to the variable capacity control actuators 41*a* and 41*b* of the right hydraulic pump 41 are generated. These capacity control hydraulic pressures PcL and PcR are supplied to the variable capacity control actuators 31*a*, 31*b*, 41*a* and 41*b* so that variable capacity control operations of the left and right hydraulic pumps 31 and 41 are carried out.

To the controller 50, actual rotation speed (Nea) information of the engine EG detected by the engine rotation sensor 51, operation information (stepping-in amount information) of an accelerator pedal 53 and operation information of an accelerator operation dial 54 are inputted. Based upon these pieces of input information, the controller 50 carries out actuation control of the first control valve 62, and further allows the engine control device (not shown) to carry out an engine drive control operation through a signal line 58. Upon input of the operation information (stepping-in amount information) of the accelerator pedal 53 or the operation information of the accelerator operation dial 54 to the controller 50, the controller 50 sends an instruction signal to the engine rotation control device so as to provide engine rotation in accordance with the accelerator operation amount so that the control device carries out the corresponding engine drive control operation (acceleration control operation or throttle control operation). Simultaneously, a target engine rotation speed (Neo) in accordance with the operation amount of the accelerator pedal 53 or the operation position of the accelerator operation dial 54 is set.

When the travel operation lever 52 is operated, the second control valve 65 adjusts and generates the capacity control hydraulic pressures PcL and PcR to be supplied to the variable capacity control actuators 31*a*, 31*b*, 41*a* and 41*b* in accordance with the operation of the travel operation lever 52 so that variable capacity control operations of the left and right hydraulic pumps 31 and 41 are carried out. In response to the variable capacity control operations, hydraulic pressures are supplied from the left and right hydraulic pumps 31 and 41 to the left and right hydraulic motors 32 and 42 so that the hydraulic motors 32 and 42 are rotation-driven, the left and right traveling devices 5 are driven and the vehicle 10 is allowed to travel in accordance with the operation of the travel operation lever 52.

In the case when the left and right hydraulic pumps 31 and 41 are actuated in this manner, since the driving loads are exerted on the engine EG, the engine rotation is lowered in response to the driving loads. This change in the engine rotation is transmitted to the controller 50, and the controller 50 controls the actuation of the first control valve 62 so as to generate an engine rotation-related control hydraulic pressure Pe corresponding to the actual engine rotation speed (Nea). At this time, for example, when the actual engine rotation speed (Nea) is coincident with the target engine rotation speed (Neo) while the engine is in a predetermined throttle state, the controller 50 generates the engine rotation-related control hydraulic pressure Pe by using the first control valve 62 so as to set the capacities of the hydraulic pumps 31 and 41 to capacities corresponding to the operation of the travel operation lever 52.

When the actual engine rotation speed (Nea) is lower than the target engine rotation speed (Neo), the controller 50 reduces the engine rotation-related control hydraulic pressure Pe to be generated by the first control valve 62. Thus, the capacity control hydraulic pressures PcL and PcR to be generated by the second control valve 65 in accordance with the operation of the travel operation lever 52 are reduced so as to correspond to the reduced engine rotation-related control hydraulic pressure Pe so that the capacities of the hydraulic pumps 31 and 41 are reduced. As a result, the driving loads of the hydraulic pumps 31 and 41 by the engine are reduced, and the engine rotation is raised. Thus, the control is performed to maintain the engine rotation at the target engine rotation speed (Neo) regardless of a change in the engine load, that is, the travel load, so that it becomes possible to positively prevent engine stalling.

Next, the following description will explain actuation control of the arm cylinder 23 (loader actuator) by the loader control device 70. As described earlier, the discharged oil from the main pump 71 driven by the engine EG is supplied to the oil passage 71*a*. In the oil passage 71*a*, a main pressure-adjusting valve 71*c* is installed so as to pressure-adjust the hydraulic pressure inside the oil passage 71*a* to a line pressure PL. The oil passage 71*a* is connected to the arm control valve 73, and by the arm control valve 73, it is further connected selectively to a rod-side port 23*a* or a bottom-side port 23*b* of the arm cylinder 23. The arm control valve 73 is actuated by receiving a pilot pressure Pp supplied to pilot ports 73*a* and 73*b* positioned at its ends.

For example, when the pilot pressure Pp is supplied to the pilot port 73*a*, the arm control valve 73 is moved to an upper action position so that the oil passage 71*a* is connected to the rod-side port 23*a* through an oil passage 72*a*. Simultaneously, the oil passage 72*b* connected to the bottom-side port 23*b* is connected to a tank through an oil passage 71*b*. As a result, oil having the line pressure PL inside the oil passage 71*a* is supplied to a rod-side oil chamber of the arm cylinder 23 so that the arm cylinder 23 is pressed in a reducing direction. In accordance with this operation, oil inside a bottom-side oil chamber is discharged from the bottom-side port 23*b* to the tank through the oil passage 72*b*, the arm control valve 73 and the oil passage 71*b* so that the arm cylinder 23 is contracted. When the pilot pressure Pp is supplied to the pilot port 73*b*, the arm control valve 73 is moved to a lower action position, and the oil passage 71*a* is connected to the bottom-side port 23*b* through the oil passage 72*b* so that the oil passage 72*a* connected to the rod-side port 23*a* is connected to the oil passage 71*b* connected to the tank. As a result, the line pressure Pp is supplied to the bottom-side oil chamber of the arm cylinder 23, with the oil inside the rod-side oil chamber being discharged to the tank, so that the arm cylinder 23 is extended.

Explanation will be given on the generation and supply control of the above-mentioned pilot pressure Pp. As described earlier, the engine rotation-related control hydraulic pressure Pe pressure-adjusted and generated by the first control valve 62 is supplied to the oil passage 62a, and in this case, the oil passage 62b branched from the oil passage 62a is connected to a third control valve 77. The third control valve 77 adjusts the engine rotation-related control hydraulic pressure Pe in accordance with the operation of the arm operation lever 78 (loader operation lever) to form the pilot pressure Pp. The pilot pressure Pp is supplied from oil passages 74a and 74b to the pilot ports 73a and 73b of the arm control valve 73 in accordance with the operation of the arm operation lever 78 so as to control the actuation of the arm control valve 73. Thus, the contraction/extension actuation of the arm cylinder 23 is controlled as described earlier so that the upward/downward actuation of the arm 21 is carried out. That is, the arm 21 is rocked upward/downward in accordance with the operation of the arm operation lever 78.

The pilot pressure Pp is formed by adjusting the engine rotation-related control hydraulic pressure Pe generated by the first control valve 62; therefore, in the case when, as described earlier, the engine rotation-related control pressure Pe is lowered so as to prevent engine stalling at the time of lowering of the engine rotation due to an increase of travel load, the pilot pressure Pp is also lowered. When the pilot pressure Pp is lowered in this manner, a problem is raised in that when the pressure is supplied to the pilot ports 73a and 73b of the arm control valve 73, a sufficient pressing force is not obtained, with the result that an actuation delay of the arm control valve 73 might occur or an actuation failure might occur. In the case when the actuation delay of the arm control valve 73 occurs or the actuation failure occurs, a problem is raised in that the upward/downward rocking actuation of the arm 21 is delayed or the actuation failure occurs even when the arm operation lever 78 is operated.

In view of these problems, the control device is provided with hydraulic pressure sensors 75 and 76 that detect the hydraulic pressures of the oil passages 74a and 74b for supplying the pilot pressure Pp. Detection signals of these hydraulic pressure sensors 75 and 76 are inputted to the controller 50, and the controller 50 is designed to detect the fact that the pilot pressure Pp has been supplied to either of the oil passages 74a and 74b. That is, when the arm operation lever 78 is operated so that the pilot pressure Pp is supplied to either of the pilot ports 73a and 73b, the controller 50 detects this fact.

Upon detection of the supply of the pilot pressure Pp to either of the pilot ports 73a and 73b, the controller 50 performs control for reducing the target engine rotation speed (Neo). In this case, as described earlier, in the case when the actual engine rotation speed (Nea) is coincident with the target engine rotation speed (Neo), the first control valve 62 is designed to generate the engine rotation-related control hydraulic pressure Pe so as to set the capacities of the hydraulic pumps 31 and 41 to such capacities as to correspond to the operation of the travel operation lever 52. That is, it is designed to generate the engine rotation-related control hydraulic pressure Pe in a manner so as to generate capacity control hydraulic pressures PcL and PcR in accordance with the operation of the travel operation lever 52.

When the actual engine rotation speed (Nea) is coincident with the target engine rotation speed (Neo) reduced in this manner, the controller 50 performs such control as to pressure-adjust and generate the engine rotation related control hydraulic pressure Pe that can generate the capacity control hydraulic pressures PcL and PcR in accordance with the operation of the travel operation lever 52. At this time, since the discharged amount is reduced in response to the reduction of the engine rotation unless the variable amounts of the hydraulic pumps 31 an 41 are changed, the capacity control hydraulic pressures PcL and PcR in accordance with the operation of the travel operation lever 52 cannot be generated in this state, as it is. Therefore, it is necessary to increase the variable capacities of the hydraulic pumps 31 and 41 in response to the reduction of the engine rotation so that the controller 50 performs such control as to increase the variable capacities of the hydraulic pumps 31 and 41 by increasing the engine rotation related hydraulic pressure Pe by using the first control valve 62.

As known from the above explanation, when the controller 50 performs such control as to reduce the target engine rotation speed (Neo), the engine rotation-related control hydraulic pressure Pe is controlled to be increased. When the engine rotation-related control hydraulic pressure Pe is increased in this manner, the pilot pressure Pp to be generated by the third control valve 77 is also increased. For this reason, the pilot pressure Pp to be supplied to the pilot ports 73a and 73b of the arm control valve 73 from the third control valve 77 in accordance with the operation of the arm operation lever 78 becomes higher, thereby making it possible to correctly operate the arm control valve 73 and consequently to prevent an actuation delay of upward/downward rocking operation and an actuation failure of the arm 21.

Figure 7:
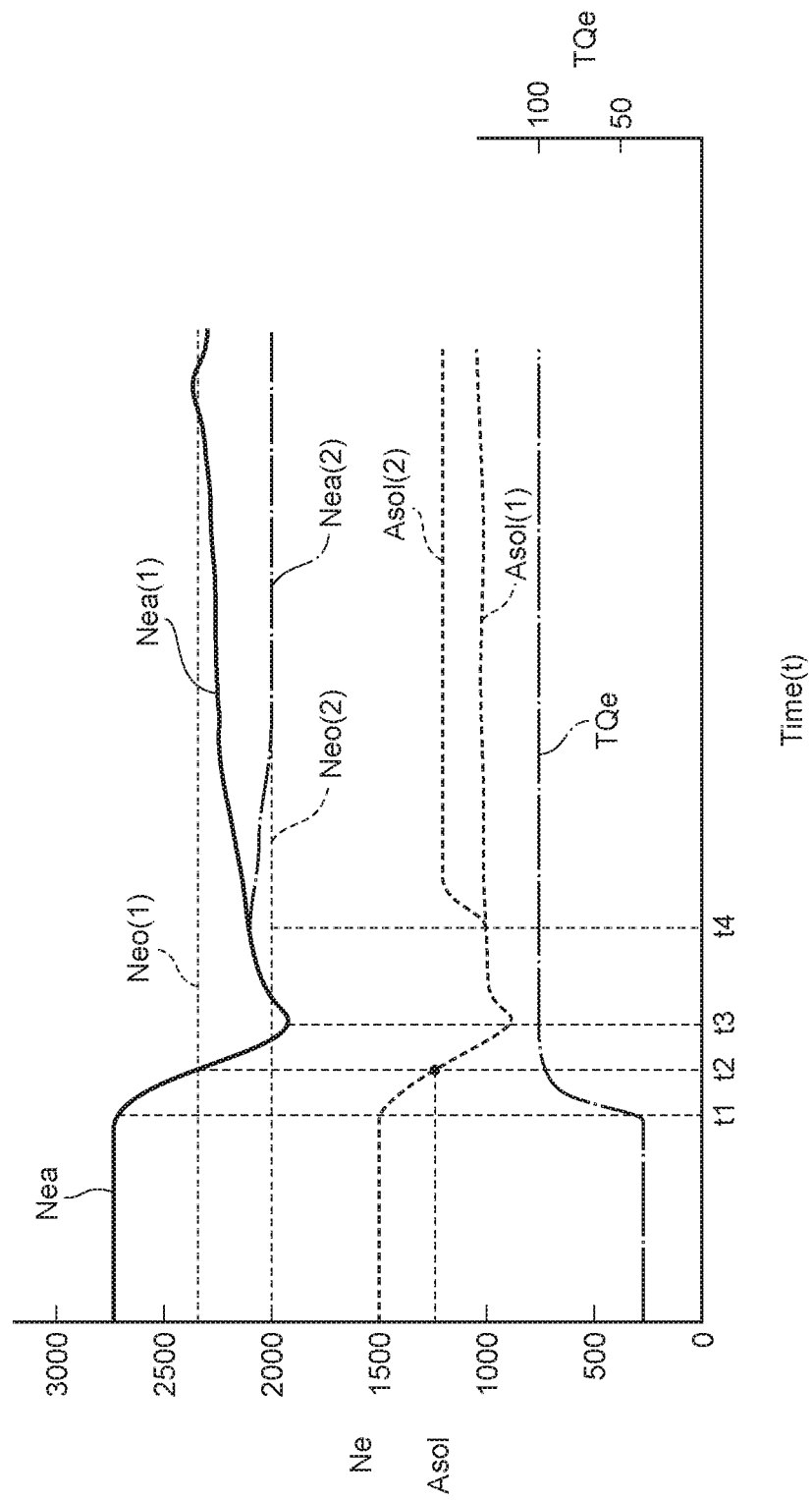
FIG. 7 is a time chart showing control contents by the control device in accordance with the second embodiment.

Referring to FIG. 7, explanation will be given on the control by using the above-mentioned controller 50. FIG. 7 shows states in which the target engine rotation speed (Neo) is set to 2400 rpm by the accelerator operation dial 54, and up to time t1, the travel operation lever 52 is in the neutral position without being operated, and from time t1, the travel operation lever 52 is operated to allow the vehicle 10 to travel, and moreover, at time t4, the arm operation lever 78 is operated. As known by these processes, the controlling and actuation processes immediately before the operation of the arm operation lever 78 at time t4 are the same as those shown in FIG. 5.

Therefore, explanation will be briefly given on the processes up to time t3. First, during a period of time up to time t1, since the travel operation lever 52 is maintained in the neutral position, the capacities of the left and right hydraulic pumps 31 and 41 are kept zero, with the engine EG being in a no-load state, so that the actual engine rotation speed Nea is set to about 2750 rpm higher than the target engine rotation speed Neo. When the travel operation lever 52 is operated from time t1, the second control valve 65 adjusts and generates the capacity control hydraulic pressures PcL and PcR in accordance with the operation of the travel operation lever 52 so that the capacities of the left and right hydraulic pumps 31 and 41 are set to capacities in accordance with the operation of the travel operation lever 52. The discharged oil of the hydraulic pumps 31 and 41 is sent to the left and right hydraulic motors 32 and 42 so as to rotate the motors, and the left and right sprockets 5a and 5b are driven to rotate so that the vehicle 10 is started to travel. Thus, as shown in the drawing, the actual engine rotation speed Nea is lowered, and the engine driving torque TQe is set from the no-load state to an output in accordance with the pump driving load, with the result that the supply current Asol of the solenoid of the first control valve 62 to be used for controlling the engine rotation-related control hydraulic pressure Pe is lowered from 1500 mA in response to the reduction of the actual engine rotation speed Nea.

At time t2, the actual engine rotation speed Nea is coincident with the target engine rotation speed Neo, and the supply current Asol of the solenoid at this time is 1250 mA. This supply current value is a value forming the target engine rotation-related control hydraulic pressure Peo by which the capacity control hydraulic pressures PcL and PcR, as they are, to be pressure-adjusted and determined from the engine rotation related control pressure Pe in accordance with the operation of the operation lever 52, are obtained. Even after passing through time t2, the actual engine rotation speed Nea is continuously lowered by the engine driving load, and the supply current Asol of the solenoid is also lowered. Thus, the engine rotation-related control hydraulic pressure Pe becomes lower than the target engine rotation-related control hydraulic pressure Peo, with the result that the capacity control hydraulic pressures Pcl and PcR are lowered to cause reductions of the capacities of the hydraulic pumps 31 and 41, thereby causing a reduction in the engine driving load. Consequently, the actual engine rotation speed Nea becomes the lowest at time t3; however, from this time on, it is raised moderately in accordance with the reduction of the engine driving load, and gradually comes closer to the target engine rotation speed Neo.

When the arm operation lever 78 is operated at time t4, the pilot pressure Pp is supplied to either of the pilot ports 73a and 73b of the arm control valve 73 in accordance with the operation. The supply of the pilot pressure Pp is detected by the hydraulic pressure sensors 75 and 76, and the detection signal is sent to the controller 50. Upon receipt of the detection signal, the controller 50 lowers the target engine rotation speed Neo. For example, as shown in FIG. 7, the target engine rotation speed Neo (1)(=2750 rpm) prior to the operation of the arm operation lever 78 is lowered to a target engine rotation speed Neo (2)(=2000 rpm). Thus, it becomes necessary to raise the capacity control hydraulic pressures PcL and PcR so as to make the capacities of the hydraulic pumps 31 and 41 greater, as described earlier, so that the control is carried out to raise the engine rotation-related control hydraulic pressure Pe.

That is, the control is carried out such that a solenoid supply current Asol (1) at the time when the arm operation lever 78 is not operated is raised to a value as shown by a solenoid current Asol (2) when the arm operation lever 78 is operated. Thus, the engine rotation-related control hydraulic pressure Pe is raised and the pilot pressure Pp is consequently raised so that the pilot pressure Pp thus raised is supplied to either of the pilot ports 73a and 73b of the arm control valve 73. Therefore, the arm control valve 73 can be actuated accurately in response to the operation of the arm operation lever 78 so that it becomes possible to prevent an actuation delay of upward/downward rocking operation and an actuation failure of the arm 21. Additionally, the actual engine rotation speed Nea is set to the actual engine rotation speed Nea (1) when the arm operation lever 78 is not operated; however, when the arm operation lever 78 is operated, the control is carried out so as to make it closer to the reduced target engine rotation speed Neo (2) as indicated by the actual engine rotation speed Nea (2).

Third Embodiment

Figure 8:
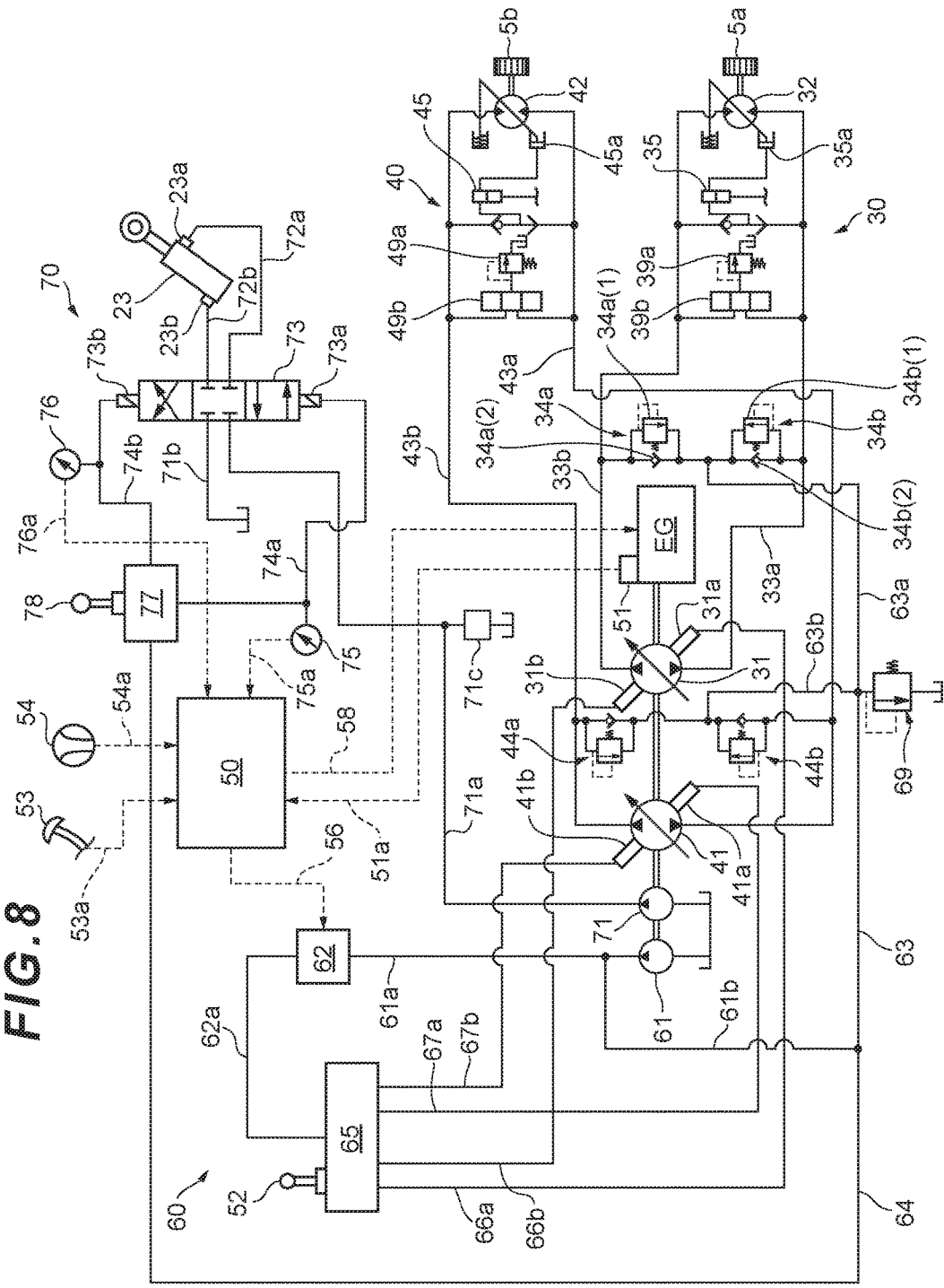
FIG. 8 is a hydraulic circuit diagram showing a configuration of a control device in accordance with a third embodiment.

Next the following description will discuss a third embodiment. In the third embodiment, the travel control of the third embodiment is the same as the travel control of the first embodiment; therefore, the explanation thereof will be omitted. In the following description, referring to FIG. 8, explanation will be given on a loader control device 70 for carrying out actuation control of the loader device 20 in accordance with the operation of the loader operation lever.

The loader control device 70 is provided with a main pump 71 that is driven by an engine EG, and its discharged oil is supplied to an oil passage 71a. The loader control device 70 carries out such control as to supply a hydraulic pressure to be applied to the oil passage 71a to a loader actuator (in FIG. 8, exemplified by arm cylinder 23). In the oil passage 71a, a main pressure-adjusting valve 71c is installed so as to adjust the hydraulic pressure inside the oil passage 71a to a line pressure PL. The oil passage 71a is connected to an arm control valve 73 (actuation control valve), and is further selectively connected to a rod-side port 23a or a bottom-side port 23b of the arm cylinder 23 by an arm control valve 73. The arm control valve 73 is an actuation control valve of a hydraulic pilot type, which is actuated by receiving a pilot pressure Pp supplied to pilot ports 73a and 73b located at the ends thereof.

For example, when the pilot pressure Pp is supplied to the pilot port 73a, the arm control valve 73 is moved to an upper action position so that the oil passage 71a is connected to the rod-side port 23a through an oil passage 72a. Simultaneously, the oil passage 72b connected to the bottom-side port 23b is connected to a tank through the oil passage 71b. As a result, oil having the line pressure PL inside the oil passage 71a is supplied to a rod-side oil chamber of the arm cylinder 23 so that the arm cylinder 23 is pressed in a reducing direction. In accordance with this operation, oil inside a bottom-side oil chamber is discharged from the bottom-side port 23b to the tank through the oil passage 72b, the arm control valve 73 and the oil passage 71b so that the arm cylinder 23 is contracted. When the pilot pressure Pp is supplied to the pilot port 73b, the arm control valve 73 is moved to a lower action position, and the oil passage 71a is connected to the bottom-side port 23b through the oil passage 72b, with the oil passage 72a connected to the rod-side port 23a being connected to the oil passage 71b connected to the tank. As a result, the line pressure PL is supplied to the bottom-side oil chamber of the arm cylinder 23, with the oil inside the rod-side oil chamber being discharged to the tank, so that the arm cylinder 23 is extended.

Explanation will be given on the generation and supply control of the above-mentioned pilot pressure Pp. As described earlier, the charged oil, discharged from the charge pump 61 and pressure-adjusted by a charge pressure control valve 69, is supplied to a third control valve 77 through the charge oil passages 61b and 64. The third control valve 77 adjusts the engine rotation-related control hydraulic pressure Pe in accordance with the operation of an arm operation lever 78 (loader operation lever) to form the pilot pressure Pp. The pilot pressure Pp is supplied from the oil passages 74a and 74b to the pilot ports 73a and 73b of the arm control valve 73 in accordance with the operation of the arm operation lever 78 so as to control the actuation of the arm control valve 73. Thus, the contraction/extension actuation of the arm cylinder 23 is controlled as described earlier so that the upward/downward rocking actuation of the arm 21 is carried out. That is, the arm 21 is rocked upward/downward in accordance with the operation of the arm operation lever 78.

Since the pilot pressure Pp is formed by adjusting the engine rotation-related control hydraulic pressure Pe generated by the charged pressure control valve 69, it is hardly influenced by a change in the engine rotation. In particular, the charged pressure control valve 69 is prepared as a valve having small variation characteristics in charged hydraulic pressure relative to a change in the discharged oil amount from the charge pump 61 upon having a change in the engine rotation, that is, as a valve causing less degradation in the override characteristics. Thus, even in the case of a change in the engine rotation, fluctuations in the pilot pressure Pp are small so that the pressure can be maintained at a predetermined pressure. Therefore, even when the engine rotation is lowered at the time of low temperature, or when the engine rotation is abruptly lowered, the actuation control of the arm control valve 73 can be positively carried out in accordance with the operation of the arm operation lever 78. Consequently, by allowing the arm cylinder 23 to accurately carry out the extension/contraction actuation, the upward/downward rocking actuation of the arm 21 can be positively carried out.

In the above-mentioned explanation, explanation has been given by exemplifying a configuration in which the travel operation lever 52 is mechanically connected to the second control valve 65. However, the travel operation lever 52 may be designed to be electrically connected to the second control valve 65 through the controller 50. In this case, the controller 50 can carry out the actuation control of the second control valve 65 based upon operation information (input information) to be inputted from the travel operation lever 52.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A control device for a hydraulic traveling device, wherein the hydraulic traveling device comprises:
    a hydraulic transmission constituted by having a hydraulic pump of a variable capacity type, which is driven by an engine, and a hydraulic motor driven by discharged oil from the hydraulic pump;
    a traveling device that is driven by the hydraulic motor;
    a travel operation device that is operated so as to instruct a traveling operation by the traveling device;
    a charge pump for supplying a charging oil to the hydraulic transmission through a charging oil passage;
    a charging pressure control valve for adjusting a hydraulic pressure inside the charging oil passage into a charging hydraulic pressure;
    a first control valve for generating an engine rotation-related control hydraulic pressure in accordance with an engine rotation speed using the charging hydraulic pressure inside the charging oil passage;
    a second control valve for generating a capacity control hydraulic pressure in accordance with the operation of the travel operation device using the engine rotation-related control hydraulic pressure, and for supplying the capacity control hydraulic pressure to a variable capacity control unit which controls the variable capacity of the hydraulic pump;
    a variable capacity controlling of the hydraulic pump being carried out by the capacity control hydraulic pressure supplied from the second control valve to the variable capacity control unit;
    an accelerator operation device that is operated so as to instruct an engine driving operation;
    an engine control device for carrying out a driving control operation on the engine in accordance with the operation of the accelerator operation device;
    a target engine rotation setting device for setting a target engine rotation speed in accordance with the operation of the accelerator operation device; and
    an engine speed detection device for detecting the engine rotation speed,
    wherein the first control valve adjusts and generates the engine rotation-related control hydraulic pressure so as to make a difference between the engine rotation speed detected by the engine speed detection device and the target engine rotation speed set by the target engine rotation setting device smaller.

2. The control device according to claim 1, wherein the first control valve adjusts and generates the engine rotation-related control hydraulic pressure by using PID control so as to make the difference between the engine rotation speed and the target engine rotation speed smaller.

3. The control device according to claim 1, further comprising:
    a hydraulic actuation device that is actuated by a hydraulic actuator;
    a main pump for supplying a working oil to be supplied to the hydraulic actuator;
    an actuation control valve of a hydraulic pilot type for performing control for supplying the discharge oil of the main pump to the hydraulic actuator;
    an actuation operation device that is operated so as to instruct the actuation of the hydraulic actuation device; and
    a third control valve for performing control so as to supply a pilot pressure for controlling the actuation of the actuation control valve to the actuation control valve in accordance with the operation of the actuation operation device,
    wherein the third control valve is designed to generate the pilot pressure by using the engine rotation-related control hydraulic pressure,
    a pilot detection device for detecting whether the pilot pressure has been supplied from the third control valve to the actuation control valve is provided, and
    when the supply of the pilot pressure to the actuation control valve has been detected by the pilot detection device, the target engine rotation speed is lowered.

4. The control device according to claim 1, further comprising:
    a hydraulic actuation device that is actuated by a hydraulic actuator;
    a main pump for supplying a working oil to be supplied to the hydraulic actuator;
    an actuation control valve of a hydraulic pilot type for performing control for supplying the discharge oil of the main pump to the hydraulic actuator;
    an actuation operation device that is operated so as to instruct the actuation of the hydraulic actuation device; and
    a third control valve for performing control so as to supply a pilot pressure for controlling the actuation of the actuation control valve to the actuation control valve in accordance with the operation of the actuation operation device,
    wherein the third control valve performs control for supplying oil that has been set to the charging hydraulic pressure inside the charging oil passage to a pilot actuation unit of the actuation control valve in accordance with the operation of the actuation operation device.

5. The control device according to claim 1, wherein the charge pressure control valve is designed to suppress fluctuations in the charging hydraulic pressure caused by a change in an oil amount to be supplied to the hydraulic transmission from the charge pump through the charging oil passage.

* * * * *